United States Patent
Pan

(10) Patent No.: US 7,522,382 B1
(45) Date of Patent: Apr. 21, 2009

(54) HEAD STACK ASSEMBLY WITH INTERLEAVED FLEXURE TAIL BOND PAD ROWS

(75) Inventor: Tzong-Shii Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 453 days.

(21) Appl. No.: 11/208,822

(22) Filed: Aug. 22, 2005

(51) Int. Cl.
*G11B 21/16* (2006.01)
*G11B 5/48* (2006.01)

(52) U.S. Cl. .................................. 360/245.9

(58) Field of Classification Search ... 360/245.1–245.9, 360/246, 264.2, 266.3, 323
See application file for complete search history.

(56) References Cited

U.S. PATENT DOCUMENTS

| | | | | |
|---|---|---|---|---|
| 3,633,189 A * | 1/1972 | Billawala | ................ | 360/245.8 |
| 5,103,359 A * | 4/1992 | Marazzo | .................. | 360/264.2 |
| 5,796,552 A * | 8/1998 | Akin et al. | ............... | 360/264.2 |
| 5,903,413 A * | 5/1999 | Brooks et al. | ............ | 360/264.2 |
| 5,923,501 A * | 7/1999 | Suzuki et al. | ............ | 360/264.2 |
| 5,995,322 A * | 11/1999 | Yanagihara | ............... | 360/264.2 |
| 5,995,329 A * | 11/1999 | Shiraishi et al. | .......... | 360/245.9 |
| 6,025,988 A | 2/2000 | Yan | | |
| 6,233,127 B1 * | 5/2001 | Shimazawa | .................. | 360/323 |
| 6,282,062 B1 * | 8/2001 | Shiraishi | .................. | 360/244.1 |
| 6,396,665 B1 * | 5/2002 | Asano | ..................... | 360/264.2 |
| 6,424,505 B1 * | 7/2002 | Lam et al. | ................... | 360/323 |
| 6,687,097 B1 * | 2/2004 | Anderson et al. | ........... | 360/323 |
| 7,059,868 B1 * | 6/2006 | Yan | ............................... | 439/67 |
| 7,092,214 B2 * | 8/2006 | Hernandez | ............... | 360/245.9 |
| 2004/0181932 A1 * | 9/2004 | Yao et al. | .................. | 29/603.03 |

* cited by examiner

*Primary Examiner*—Craig A Renner
(74) *Attorney, Agent, or Firm*—Barcelo & Harrison LLP

(57) ABSTRACT

Flexure tails are provided for coupling heads of head gimbal assemblies to a flex cable in a disk drive. An exemplary flexure tail comprises a substrate including a non-straight edge defining a protruding portion and a recessed portion. The recessed portion includes a first number of bonding pads arranged in a primary row, and the protruding portion including a second number of bonding pads arranged in a secondary row. Flexure tails for up and down heads fit together to form a flexure tail assembly in which the respective secondary rows form a single row. Flexure tail assemblies are joined to the flex cable in disk drives of the invention.

10 Claims, 5 Drawing Sheets

HEAD STACK ASSEMBLY WITH INTERLEAVED FLEXURE TAIL BOND PAD ROWS

FIELD OF THE INVENTION

The present invention relates generally to the field of disk drives and more particularly to connecting electrical components of heads to circuitry thereof.

BACKGROUND OF THE INVENTION

Magnetic and optical disk drives store and retrieve data for digital electronic apparatuses such as computers. A typical disk drive comprises a head, including a slider and a transducer, in very close proximity to a surface of a rotatable disk. The transducer, in turn, includes a write element and/or a read element. As the disk rotates beneath the head, a very thin air bearing is formed between the surface of the disk and an air bearing surface of the slider. The air bearing causes the head to "fly" above the surface of the disk. As the head flies over the disk, the write element and the read element can be alternately employed to write and read data bits along a data track on the disk.

In order to keep the head properly oriented and at the correct height above the disk while in flight, and to move the head from one track to another, disk drives employ a head gimbal assembly (HGA) and voice coil actuator assembly. The HGA typically comprises the head and a suspension assembly that further includes a load beam, a gimbal that attaches the head to the load beam, and a swage mount.

The voice coil actuator assembly comprises a fixed magnet assembly and a pivoting actuator arm. One side of the actuator arm secures the load beam while the other side includes a voice coil. The voice coil is configured to move laterally within the magnet assembly. Translating the head is achieved by varying an electric current applied to the voice coil. Varying the current causes the voice coil to move laterally within the magnet assembly which rotates the actuator arm around the pivot, thus translating the head.

Most high capacity disk drives employ a stack of several closely spaced disks, and for each disk there are two heads, one positioned above the disk and one positioned below. If the head is disposed "above" one of the disks (i.e. closer to the disk drive top cover than the disk) of the disk stack and faces "downward" (i.e. away from the top cover), then the head is termed a "down head," otherwise the head is termed an "up head." It will be understood that the designations of "up" and "down" and "upward" and "downward" in this context, can be chosen arbitrarily by the disk drive designer to create a convenient terminology convention, and should not be understood to necessarily accord with any external frame of reference such as gravity.

FIG. 1 illustrates an exemplary head stack assembly (HSA) 100 for use in conjunction with a disk stack (not shown) in a high capacity disk drive. The HSA 100 comprises a pivot bearing cartridge, an actuator body, a coil, a coil support, and a number of HGAs 110 attached to a plurality of actuator arms 120 of the actuator body. The HSA 100 also comprises a flex clip and a preamp. Each HGA 110 comprises a suspension assembly, including a load beam 130, and a head 140.

As shown in FIG. 2, electrical components such as the transducer on each head 140 are able to communicate with circuits of the disk drive, or with testing circuits of a component tester for testing purposes prior to assembly, through a set of electrical traces 200 on a support that is sometimes referred to as a flexure tail 210. The flexure tail 210 extends along the length of the load beam 130 and the actuator arm 120 (FIG. 1). A set of bonding pads 220 are disposed at an end 230 of the flexure tail 210 to allow the head 140 to be connected to the circuitry of the disk drive. When multiple HGAs 110 are assembled to form the HSA 100 (FIG. 1), the bonding pads 220 of each flexure tail 210 are soldered to connectors at an end of a flex cable 150 (FIG. 1) to complete the disk drive circuits. An out of plane bend 240 in the flexure tail 210 allows the bonding pads 220 to lie in a plane that is perpendicular to a plane defined by the load beam 130 for assembly to the end of the flex cable 150.

It will be appreciated that the ends 230 of the flexure tails 210 from each of the heads 140 of the HSA 100 are bonded to the same flex cable 150, and a height of the flex cable 150 is limited by at least a height of the interior of the drive enclosure. Effectively, therefore, a height, h, of the end 230 of the flexure tail 210 is essentially limited to about half of the disk-to-disk spacing of the disk stack so that two ends 230 can fit the space between two adjacent disks of the disk stack. Due to the narrowness of the disk-to-disk spacing in current disk drives, the height, h, of the end 230 must be small. Accordingly, the bonding pads 220 on the end 230 of the flexure tail 210 are arranged in a single row.

Increasingly sophisticated disk drives are being designed that require HGAs having additional electrical components beyond just the read and write transducers (e.g. microactuators, heaters for dynamic fly height control, etc.), and each additional electrical component requires further bonding pads on the end of the flexure tail. However, other dimensional limitations of the connector at the end of the flex cable 150 prevent the ends 230 from becoming increasingly long, and soldering and other electrical connection requirements prevent bonding pads 220 from being made smaller and more closely spaced. Accordingly, accommodating additional electrical components poses a problem for joining flexure tails 210 to flex cables 150.

SUMMARY

An exemplary head gimbal assembly comprises a flexure tail. The flexure tail comprises a substrate including a non-straight edge defining a protruding portion and a recessed portion. The recessed portion includes a first number of bonding pads arranged in a primary row, and the protruding portion including a second number of bonding pads, less than the first number of bonding pads, arranged in a secondary row. Flexure tails coupled to up and down heads are termed up head flexure tails and down head flexure tails, respectively. Up and down head flexure tails are complementary in that they generally fit together such that the respective secondary rows form a single row when the non-straight edges of the two flexure tails are mated together to form a flexure tail assembly.

A head stack assembly comprises a flexure tail assembly. The flexure tail assembly, according to an embodiment of the invention, comprises an up head flexure tail and a down head flexure tail. The up head flexure tail includes a first number of bonding pads arranged in an up head primary row and a second number of bonding pads, less than the first number of bonding pads, arranged in an up head secondary row. Similarly, the down head flexure tail includes a third number of bonding pads arranged in a down head primary row and a fourth number of bonding pads, less than the third number of bonding pads, arranged in a down head secondary row. The secondary rows of the two flexure tails are generally aligned with one another to form a single row, according to this exemplary embodiment.

A disk drive, according to an embodiment of the invention, comprises a head stack assembly and a flex cable having at one end a flex cable connector, including a preamp. The head stack assembly includes an up head, a down head, and a flexure tail assembly joined to the flex cable connector. An up head flexure tail of the flexure tail assembly is coupled to the up head, and a down head flexure tail of the flexure tail assembly is coupled to the down head.

DETAILED DESCRIPTION OF THE INVENTION

Figure 3:
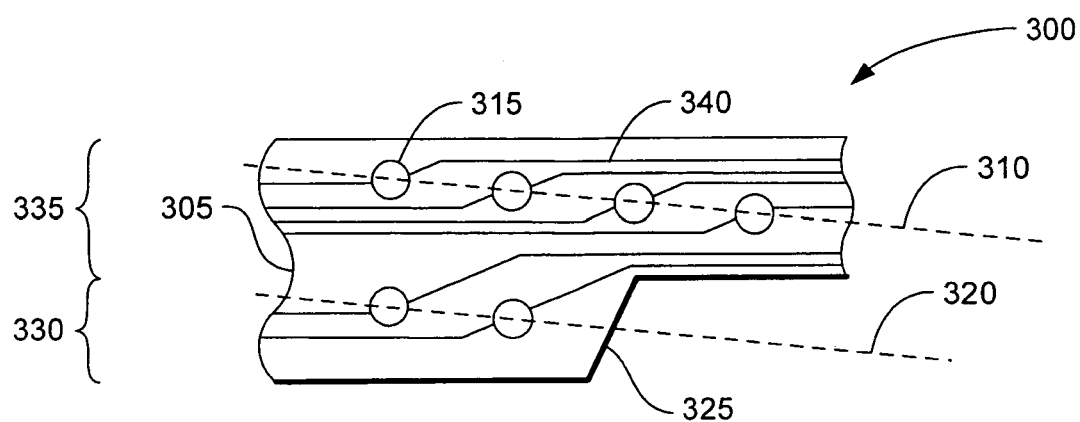
FIG. 3 shows a top view of a portion of a flexure tail according to an embodiment of the present invention.

FIG. 3 illustrates a portion of a flexure tail 300 for a HGA according to an exemplary embodiment of the invention. The flexure tail 300 comprises a substrate 305 including a primary row 310 of a first number of bonding pads 315 and a secondary row 320 of a second number of bonding pads 315. The substrate 305 also includes a non-straight edge 325 that defines a protruding portion 330 and a recessed portion 335. The recessed portion 335 includes the primary row 310 while the protruding portion 330 includes the secondary row 320. The second number of bonding pads 315, in some embodiments, is less than the first number of bonding pads 315.

Figure 4:
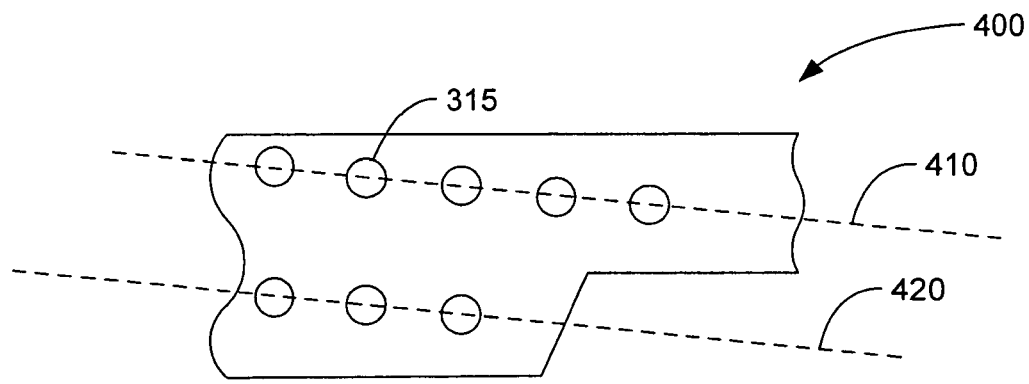
FIG. 4 shows a top view of a portion of a flexure tail according to another embodiment of the present invention.

In the embodiment illustrated in FIG. 3, the primary row 310 includes four bonding pads 315 and the secondary row 320 includes two bonding pads 315. In another exemplary embodiment, shown in FIG. 4, a flexure tail 400 having a total of eight bonding pads 315 comprises a primary row 410 including five bonding pads 315 and a secondary row 420 including three bonding pads 315. An exemplary size for the bonding pads 315 in these embodiments is 400 μm×400 μm. In some embodiments, the primary row 310 and the secondary row 320 are substantially parallel.

As will be discussed with respect to FIG. 5, the flexure tail 300 can be mated with a complementary flexure tail to form a flexure tail assembly that can be attached to a flex cable. Because of the shape of the substrate 305 and the particular arrangement of bonding pads 315 thereon, the secondary row 320 of the flexure tail 300 generally aligns with a secondary row of the complementary flexure tail to form a single row of bonding pads 315. This allows for two flexure tails, one for an up head and one for a down head, to form a flexure tail assembly with only three rows of bonding pads.

As shown in FIG. 3, electrical traces 340 connect each of the bonding pads 315 to a corresponding electrical component such as a transducer (not shown). In some embodiments, the traces 340 continue from each bonding pad 315 to a detachable test pad set (not shown). In FIG. 3, the transducer is disposed to one side of the illustrated portion of the flexure tail 300 while the detachable test pad set is disposed to a side opposite the one side. The detachable test pad set is used to test the electrical components on the transducer before individual HGAs are assembled into a HSA. During the assembly process, the detachable test pad set is removed.

Figure 5:
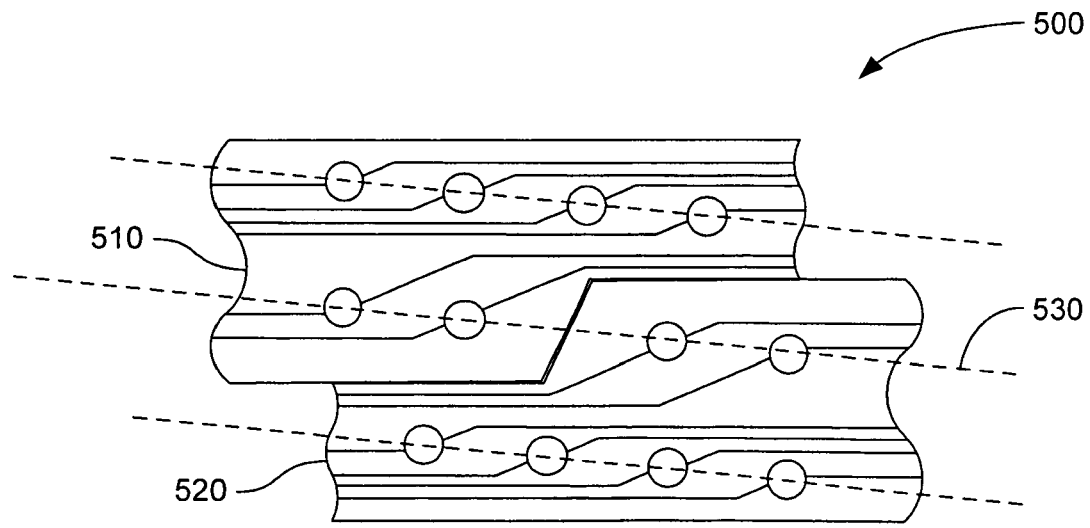
FIG. 5 shows a top view of a flexure tail assembly according to an embodiment of the present invention.

FIG. 5 illustrates a flexure tail assembly 500 according to an exemplary embodiment of the invention. The flexure tail assembly 500 comprises an up head flexure tail 510 and a down head flexure tail 520. The up and down head flexure tails 510 and 520 are complementary to one another in that one is for an up head and one is for a down head. Each of the up and down head flexure tails 510 and 520 include primary and secondary rows of bonding pads. When the up and down head flexure tails 510 and 520 are mated together, as shown in FIG. 5, the secondary rows of the two flexure tails 510 and 520 are generally aligned with one another to form a single row 530.

Figure 6:
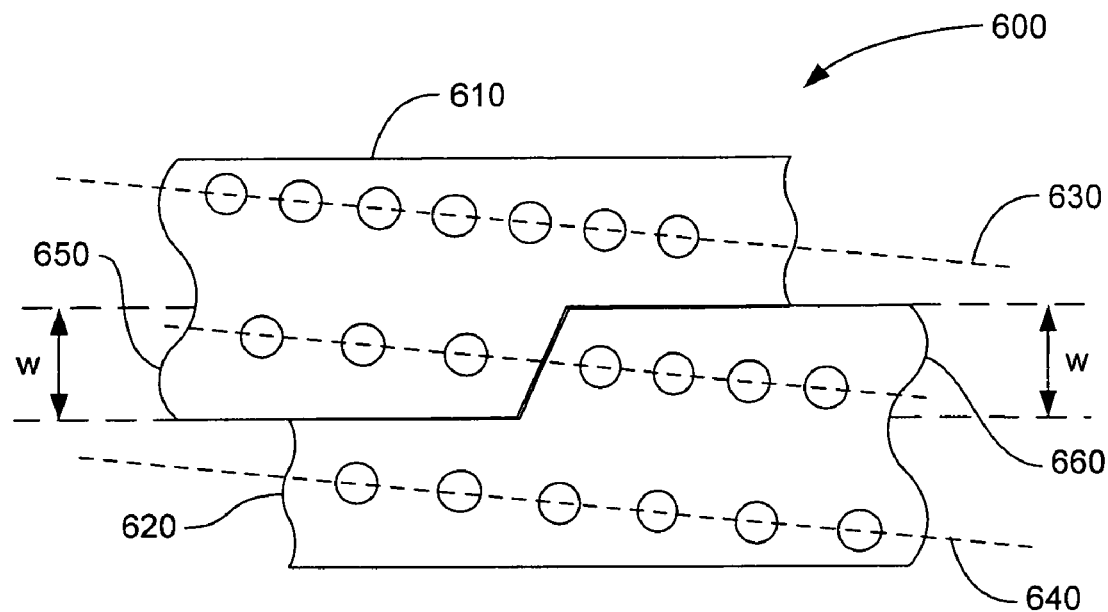
FIG. 6 shows a top view of a flexure tail assembly according to another embodiment of the present invention.

It will be appreciated from FIG. 5 that the up and down head flexure tails 510 and 520 need not be mirror images to be complementary to one another and may vary from one another in a number of ways so long as the two head flexure tails 510 and 520 generally fit together so that the two secondary rows form a single row 530. For example, as shown in FIG. 6, an up head flexure tail 610 and a down head flexure tail 620 of a flexure tail assembly 600 each include 10 bonding pads but up head primary row 630 includes seven bonding pads while down head primary row 640 includes six bonding pads.

In other embodiments the total number of bonding pads on the two flexure tails is different, for example, where only one of the up and down heads includes a grounding circuit. Also, the centers of the bonding pads on a row are not required to be collinear as shown in FIGS. 3-6. In other words, the centers of the bonding pads on a row can lie both above and below the statistical average line that defines the row. Moreover, the non-straight edges of the two flexure tails are not required to be contiguous, although shown as contiguous in the illustrated embodiments. There is likewise no requirement that the respective recessed and protruding portions be the same for complementary flexure tails, though in some embodiments a width, w, of the protruding portions 650 and 660 are substantially equal.

Further still, flexure tails according to some embodiments of the invention can include more than one primary or secondary row. Thus, for example, two complementary flexure tails can each have one primary row and two secondary rows so that a flexure tail assembly has four rows of which two rows are shared. As another example, two complementary flexure tails can each have two primary rows and one secondary row so that a flexure tail assembly has five rows of which one row is shared.

Figure 1:
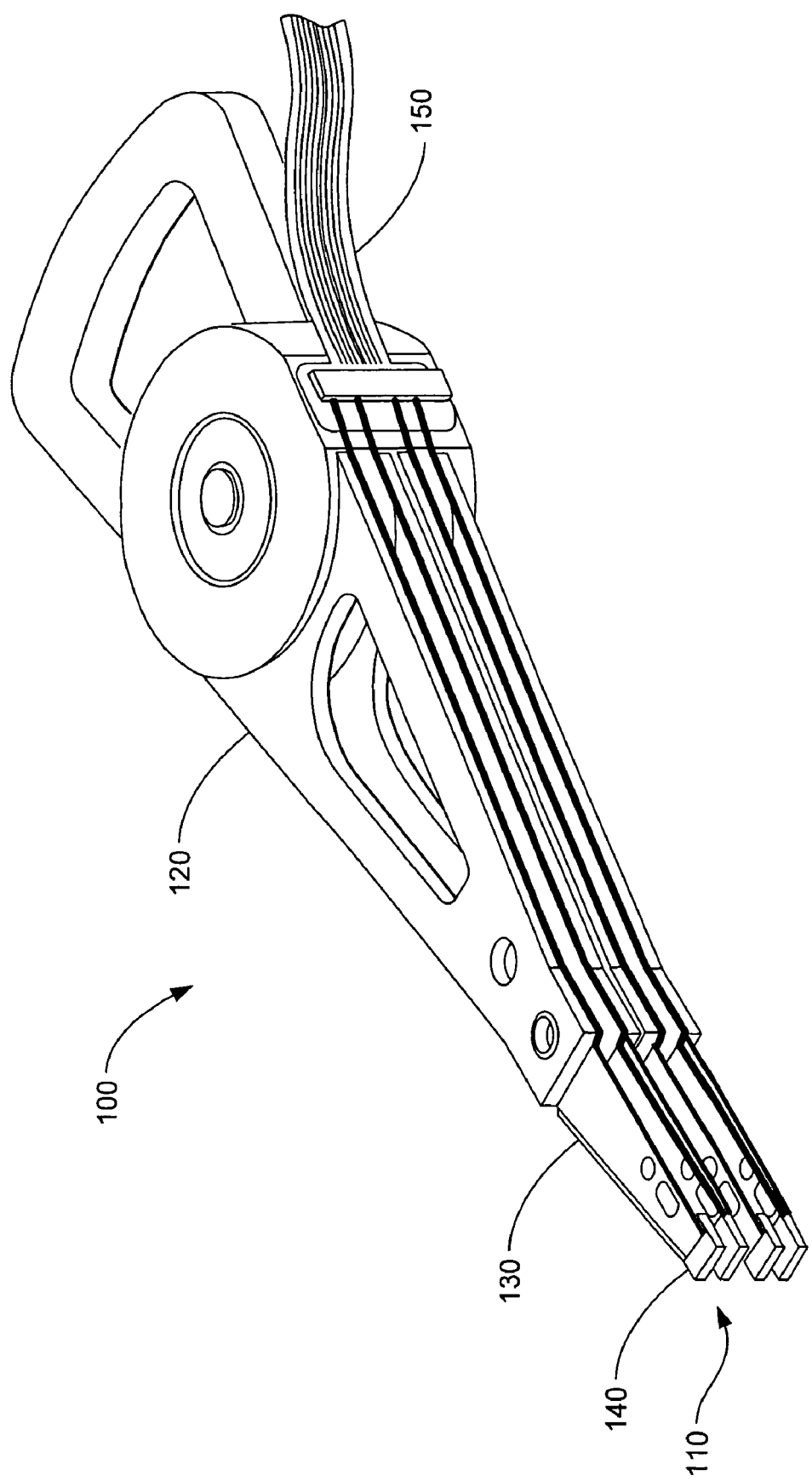
FIG. 1 shows a perspective view of a head stack assembly according to the prior art.
Figure 2:
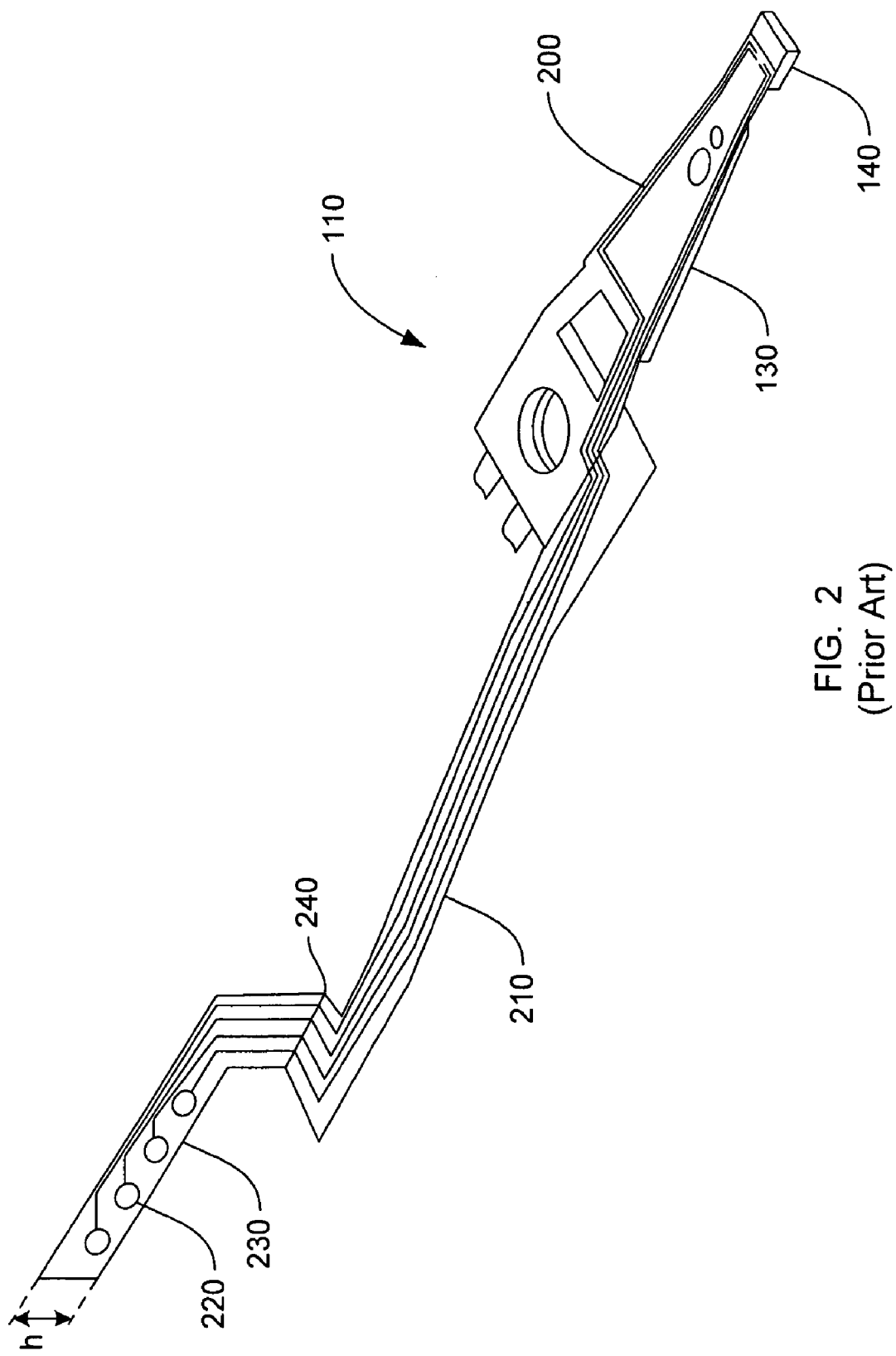
FIG. 2 shows a perspective view of a head gimbal assembly with a flexure tail according to the prior art.
Figure 7:
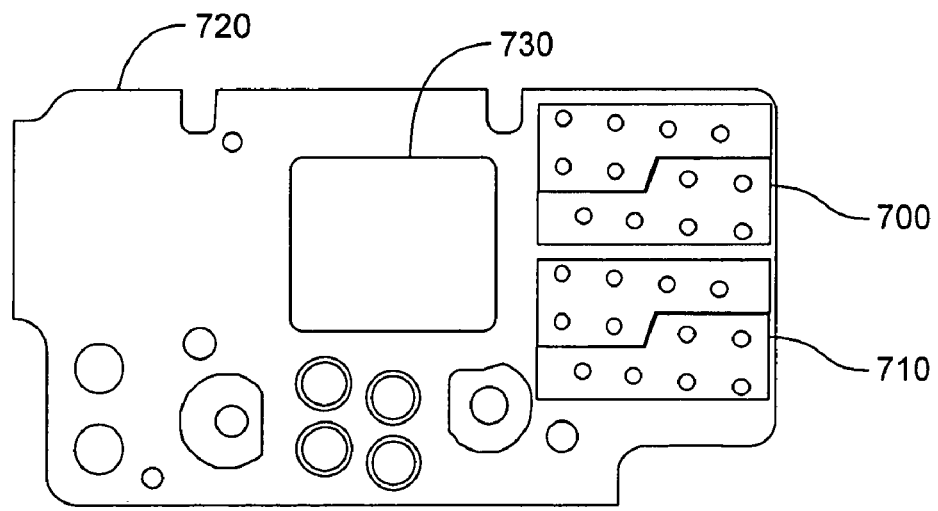
FIG. 7 shows a top view of two flexure tail assemblies attached to a flex cable connector according to an embodiment of the present invention.

FIG. 7 illustrates two flexure tail assemblies 700, 710 mounted on a flex cable connector 720 at one end of a flex cable 150 (FIG. 1) according to an exemplary embodiment of the invention. The flex cable connector 720 of the flex cable also comprises various attachment points and components including a preamp 730. It can be seen from FIG. 7 that the space available for the flexure tail assemblies 700, 710 is limited by the layout of the flex cable connector 720 of the flex cable 150.

Figure 8:
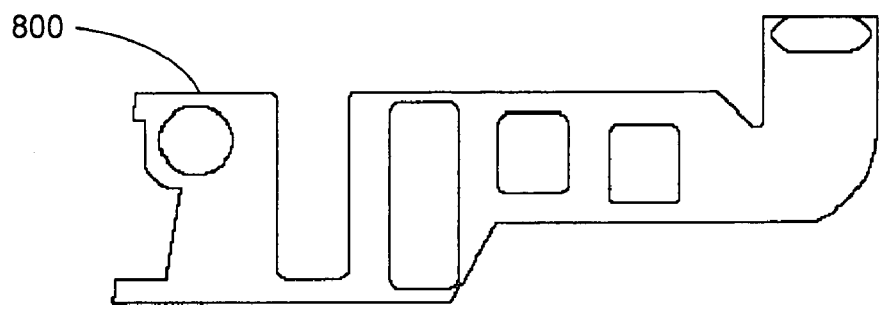
FIGS. 8-10 show successive layers of flexure tail according to an embodiment of the present invention.
Figure 9:
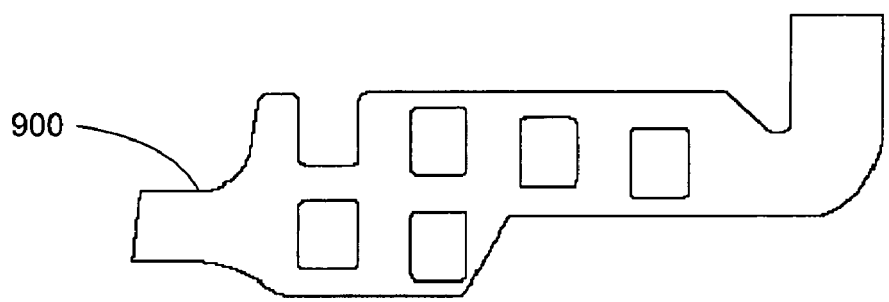
Figure 10:
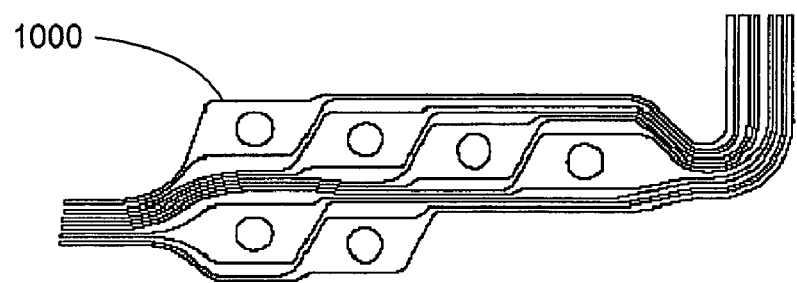
Figure 11:
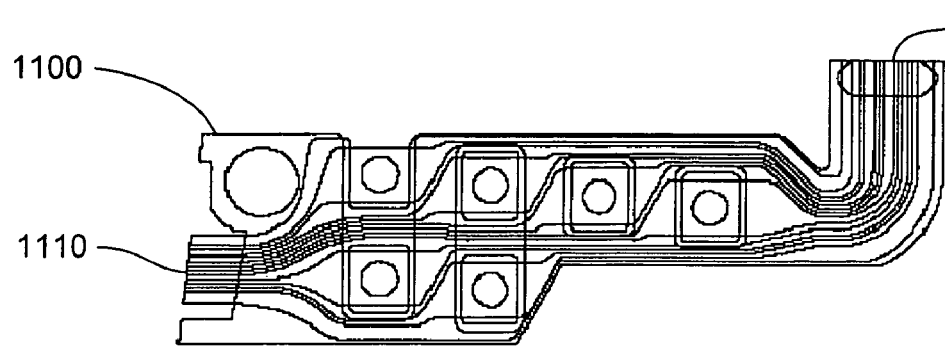
FIG. 11 shows the layers of FIGS. 8-10 superimposed to form a flexure tail according to an embodiment of the present invention.

FIGS. 8-10 illustrate exemplary layers of an embodiment of a flexure tail 1100 shown in FIG. 11. FIG. 8 shows a semi-rigid support layer 800. The support layer 800 can be made from a thin piece of stainless steel, for example. A dielectric layer 900 is shown in FIG. 9. The dielectric layer is formed, in some embodiments, from polyimide. FIG. 10 shows a trace layer 1000, made of copper in one embodiment.

In the flexure tail 1100 of FIG. 11 the dielectric layer 900 is disposed between, and electrically insulates, the trace layer 1000 and the support layer 800. In some embodiments, copper, polyimide, and stainless steel are laminated together and then masked and etched in multiple steps to create the flexure tail 1100. It will be noted that aligned apertures in both of the support and dielectric layers 800 and 900 allow bonding pads of the flexure tail 1100 to be accessed from either side. Additionally, the traces on one side 1110 of the flexure tail 1100 continue to the transducer of the head, while the traces on the other side 1120 of the flexure tail 1100 continue to a detachable test pad set.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A head stack assembly comprising:
   a flexure tail assembly comprising
      an up head flexure tail including a first number of bonding pads arranged in an up head primary row and a second number of bonding pads, less than the first number of bonding pads, arranged in an up head secondary row; and
      a down head flexure tail including a third number of bonding pads arranged in a down head primary row and a fourth number of bonding pads, less than the third number of bonding pads, arranged in a down head secondary row;
      the secondary rows of the two flexure tails being generally aligned with one another to form a single row.

2. The head stack assembly of claim 1 wherein the second and fourth numbers of bonding pads are the same.

3. The head stack assembly of claim 1 wherein only one of the up and down heads includes a grounding bonding pad.

4. The head stack assembly of claim 1 wherein the flexure tail assembly comprises one row of bonding pads less than a sum of a number of rows of bonding pads on the up head flexure tail plus a number of rows of bonding pads on the down head flexure tail.

5. The head stack assembly of claim 1 wherein the flexure tail assembly includes not more than three rows of bonding pads.

6. The head stack assembly of claim 1 wherein the up head secondary row is disposed on a protruding portion of the up head flexure tail and the down head secondary row is disposed on a protruding portion of the down head flexure tail.

7. The head stack assembly of claim 6 wherein a width of the protruding portion of the up head flexure tail equals a width of the protruding portion of the down head flexure tail.

8. A disk drive comprising:
   a flex cable having at one end a flex cable connector including a preamp; and
   a head stack assembly including an up head, a down head, and a flexure tail assembly joined to the flex cable connector, the flexure tail assembly including
      an up head flexure tail coupled to the up head and including a first number of bonding pads arranged in an up head primary row and a second number of bonding pads, less than the first number of bonding pads, arranged in an up head secondary row; and
      a down head flexure tail coupled to the down head and including a third number of bonding pads arranged in a down head primary row and a fourth number of bonding pads, less than the third number of bonding pads, arranged in a down head secondary row;
      the secondary rows of the two flexure tails being generally aligned with one another to form a single row.

9. The disk drive of claim 8 wherein the first and third numbers of bonding pads are four and the second and fourth numbers of bonding pads are two.

10. The disk drive of claim 8 wherein the first and third numbers bonding pads are five and the second and fourth numbers of bonding pads are three.

* * * * *